July 31, 1973  R. I. SARBACHER  3,749,608

PRIMARY ELECTROCHEMICAL ENERGY CELL

Filed Nov. 24, 1969

INVENTOR
ROBERT I. SARBACHER

BY *Paris, Haskell & Levine*
ATTORNEYS

United States Patent Office 3,749,608
Patented July 31, 1973

3,749,608
PRIMARY ELECTROCHEMICAL ENERGY CELL
Robert I. Sarbacher, Arcadia, Calif., assignor to
John C. Bogue, Santa Monica, Calif.
Filed Nov. 24, 1969, Ser. No. 879,429
Int. Cl. H01m 17/02
U.S. Cl. 136—83 R                                    10 Claims

ABSTRACT OF THE DISCLOSURE

A high energy and current capacity reserve primary electrochemical cell uses a specially coated base element for the cathode electrode. The coating is the product of sintering nickelous ammonium sulfate on the surface of the base element, and in the complete cathode system this coating is interposed between the base element and an electrochemically active cathodic material. The maximum current and energy capacity of the cell per unit weight and volume is also enhanced by using foraminous electrodes to increase the available surface area per unit volume and by designing the associated cell structure to maximize the effect of the increased surface areas of the foraminous electrodes.

BACKGROUND OF THE INVENTION

There are numerous environments where a very high quantity of electrical power is required to be delivered in a short period of time, and accordingly one objective of electrochemical energy cell research has been to develop cells which can provide a high current output per unit weight and volume. Obviously, the total energy that an electrochemical primary cell can deliver is controlled in large part by the quantity of electrochemical reactants contained within the cell. However, different electrochemical energy cells are capable of delivering their available energy within different spans of time, and indeed this difference between cells is applicable to cells utilizing the same basic electrochemical reaction. The rate at which the energy of a cell can be delivered, and the total energy available per unit volume and weight is therefore not only a function of the chemical reactants, but a function of other parameters of the cell as well, including both physical and adjunctive chemical parameters. In particular, it has long been recognized that the physical-chemical structure of the electrodes is a very important characteristic in determining the activity or maximum current capability of an electrochemical cell.

SUMMARY OF THE INVENTION

The present invention relates to primary energy cells, and particularly to a primary electrochemical cell, preferably operating as a reserve cell, that is capable of delivering very high current and energy per unit weight and volume.

In order to obtain a high power or current output electrochemically, it is important to select a highly reactive electrochemical couple, and among the more suitable are cells having anodes of magnesium, zinc, or aluminum, and cathodes of silver oxide, copper oxide, nickel oxide, or mercuric oxide. However, the present invention is not limited to any particular electrode couple, nor to the ones stated, but is applicable to most, if not all cell systems, to improve their current or power capacity per unit weight and volume.

One primary aspect of the present invention resides in the cathode physical-chemical structure. Conventionally, the cathode of a primary cell is fabricated with an electrically conductive inert structural base element, upon which the active cathodic electrochemical material is coated. It has been found that the electrode activity of the cathode can be greatly enhanced if the structural base element carries a coating produced by sintering nickelous ammonium sulfate on its surface, so that the coating is interposed between the base element and the electrochemically reactive cathodic material.

In accordance with another feature of the invention, it has also been found that the power and energy capacity of the cell can be significantly enhanced if the electrodes, and particularly the anode, is foraminous, to increase its surface area per unit volume. Further, to this end, special provision is made in fabricating the cooperating elements of the cell so that they follow the contour of the electrode interstices, thereby maximizing the electrochemical effect of the foraminous electrode structure and the chemical content of the cell.

It is therefore one object of the present invention to provide a primary electrochemical energy cell having a very high current and energy capacity per unit volume and weight.

Another object of the present invention is to provide a highly active cathodic electrode system for primary electrochemical energy cells.

And still another object of the present invention is to provide a physical structure for the elements of a primary electrochemical energy cell which maximizes the useful area of electrochemical reaction per unit volume.

Other objects and advantages of the present invention will become apparent to those skilled in the art from a consideration of the following detailed description of one embodiment of the invention, had in conjunction with the accompanying drawings.

DETAILED DESCRIPTION

For purposes of illustration, the present invention is described herein as embodied in a magnesium/magnesium perchlorate, lithium perchlorate/mercuric oxide cell; however, as previously stated, the features of this invention are not limited to that cell.

Figure 1:
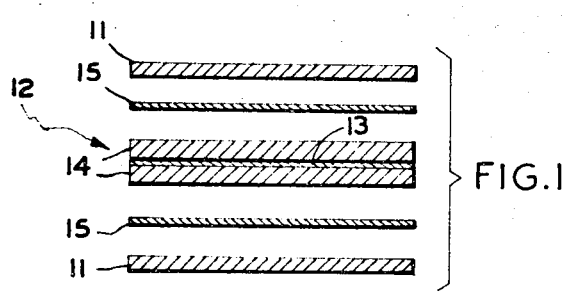
FIG. 1 is a schematic exploded view of a partial battery of cells as contemplated by the present invention.

In the exploded schematic illustration of FIG. 1, a partial battery of cells is illustrated, showing two anodes and one cathode terminal. The anodes 11 are formed from magnesium sheet stock, such as that produced by Dow Chemical Company under the ASTM designation AZ-21 or AZ-31, preferably about 0.005 inch in thickness. The cathode 12 comprises a stainless steel sheet 13 approximately 0.001 inch thick, as a structural base element, both sides of which are coated with a mercuric oxide paste 14. A thin absorbent fibrous separator 15, which may be a filter paper stock, is interposed between each anode 11 and the cathode 12 and carries an electrolyte solution.

Figure 2:
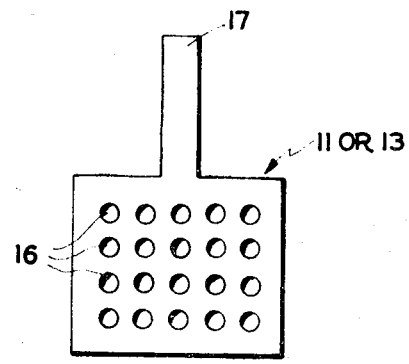
FIG. 2 is a face view of an electrode structure in accordance with the present invention.

The anode 11 and stainless steel cathode base element 13 are all substantially identical in physical structure, and are illustrated in face view in FIG. 2. Both electrode elements 11 and 13 are made foraminous by punching holes 16 therethrough. Optimumly, each hole 16 is about 1/16 inch in diameter, and they are uniformly distributed with a spacing that provides about twenty holes per square inch of surface area, resulting in a ratio of void area to overall area of about 0.066 to 1. A terminal tab 17 is provided for each of said electrode elements.

In accordance with the present invention, before the mercuric oxide is applied to the stainless steel base element 13, the punched element 13 is heated in a hydrogen atmosphere (or other reducing atmosphere) at a temperature of about 300° C. for a period of about twenty minutes, to remove all oxide from the surface. This element is then sputtered in vacuum with nickel carbide to form a surface coating between about 0.0003 and 0.0008 inch thick. Then a thin layer of nickelous ammonium sulfate crystals is spread over the surface of the electrode element 13, distributing about one gram of the salt per square inch of overall area, and the salt is then sintered by heating at about 360° C. in nitrogen or other inert atmosphere. Processing of the stainless steel base element, once freed of surface oxide, and until the sintering is completed, is of course done with a minimum exposure to oxygen.

The stainless steel electrode element 13 thus prepared with a sintered nickelous ammonium sulfate coating, is ready to receive the mercuric oxide paste. This paste is prepared by mixing the mercuric oxide with carbon black to improve conductivity, in the weight ratio of about 9.5 to 1, together with a small amount of a suitable binder, such as about 0.05% by weight of carboxymethylcellulose. This mixture is ball milled dry for about one hour, and then enough water is added to make a thick paste and it is further ball milled for an additional hour. The resultant mixture is spread in a thin layer about 1⁄32 inch thick over the two surfaces of the stainless steel electrode element 13 prepared as above-described. About one and one-half grams of paste are required per square inch of overall electrode surface. The electrode thus prepared is dried in an oven at a temperature of about 200° F. for about thirty minutes.

It will be appreciated that in preparing an electrode 12 shown in FIG. 1, the prepared stainless steel base element 13 is coated on both sides, and the paste enters into the punched holes 16 thereof. A structural interlock is thus provided between paste and base element to strengthen the assembled electrode system.

Figure 3:
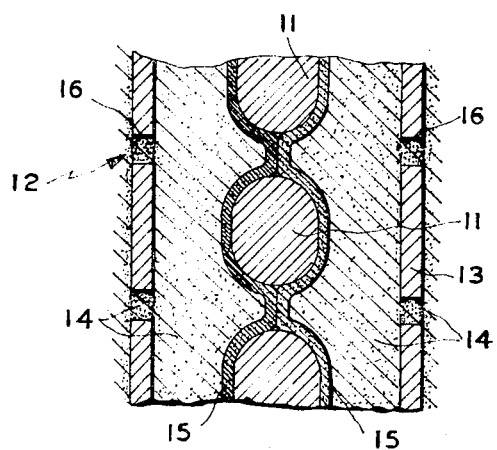
FIG. 3 is a cross sectional and fragmentary detailed view of a partial battery of cells embodying the principles of the present invention.

A physically assembled series of cells is shown in the enlarged fragmentary cross sectional view of FIG. 3. In order to take advantage of the increased surface area provided by the punchings in the anode 11, the separators 15 are caused to conform to the holes and follow the interstices thus formed, thereby maximizing the electrolyte-anode interface. Also, the surfaces of the cathode mercuric oxide layers 14 likewise conform to the foraminous anode contour, maximizing the chemical reactant contents of the cell. This effect can be obtained by shaping the surfaces of the mercuric oxide paste layers when the cathodes are formed, by embossing with a template before the paste is dried. Then, when the anode and cathode electrodes are brought together in assembled relation with fibrous separators 15 interposed therebetween, the fibrous layers are caused to conform to the contour of the cathode surface and assume the shape shown in FIG. 3. Obviously, if desired, the fibrous electrolyte carriers or separators 15 can be sprayed or pulp molded directly on the anode 11.

Figure 4:
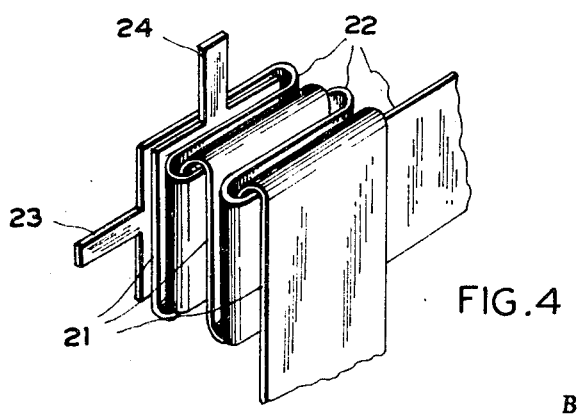
FIG. 4 is an illustration of one effective mode of arranging the anode and cathode of a cell, in accordance with the present invention.

The battery illustrated in FIG. 3 is formed by the usual stacking of flat anode and cathode plates with interposed separators. Alternatively, a very effective form of cell construction is illustrated in FIG. 4. A first electrode strip 21 is sinusoidally formed into a number of continuous superposed leaves, while the other electrode strip 22 is interleaved therewith by being similarly sinusoidally formed orthogonally to the first strip. The tabs 23 and 24 provide the terminals for the two electrodes. One of these electrode strips is the anode and corresponds completely to the above-described anodes 11, while the other electrode strip is the cathode, and corresponds entirely with the above-described cathodes 12. A separator, or separators, between the juxtaposed leaves of the two electrode strips 21 and 22 is not shown to avoid unnecessary confusion in the drawings. It is apparent however, that fibrous s eparator strips mounted on both sides of one of the electrode strips would provide the necessary function. Alternatively, separator layers could be formed on one strip by spraying or pulp molding. It is best to form the cell of FIG. 4 before the mercuric oxide coating is dried, and while it is still in a plastic state. After the cell is formed and compressed to bring all adjacent surfaces into contact, and physical surface conformity with one another, the unit is baked at a temperature of about 220° F. until dry.

In the preferred form of the invention, the electrolyte employed is a 5 normal aqueous perchlorate solution of magnesium and lithium, in the ratio of 95 to 5 by weight. This electrolyte can be incorporated in the fibrous carriers or separators 15 at the time the battery is assembled; but since the shelf life of a battery with these highly active materials is rather limited, it is preferred for most purposes that the cell or battery be used in a reserve manner. In such instance, a container of the electrolyte is separately encased within the battery housing, with means to rupture the container when it is desired to put the battery to use. When the container is ruptured, the electrolyte then distributes itself throughout the fibrous separators and porous anodes. To facilitate this distribution, the battery housing can be evacuated in its manufacture.

Once charged with electrolyte solution, the entire battery is immersed in electrolyte and because of the voids or holes 16 in the electrodes, there is complete electrolytic equalization of potentials between all cells of the battery, thereby enhancing the battery's output efficiency. Obviously, effective electrolyte equalization requires ready electrolyte communication between cells, but this communication is obtained at the sacrifice of anodic material per unit volume in the form of holes 16 in anode plates 11. It has been found that optimum balance between all competing factors is obtained with a voids area of about 6.6% of the overall area of the electrode.

To illustrate the energy capacity and activity of cells produced in accordance with the present invention, a single battery using the specific electrodes and electrolyte hereinabove described, and having an overall volume of one cubic inch, can provide an output of 5 amperes at 1.5 volts for 60 minutes.

Having thus described the present invention by reference to one specific embodiment thereof, it is not intended that the invention be limited thereto, for numerous variations and modifications will be apparent to those skilled in the art. Such modifications and variations as are embraced by the spirit and scope of the appended claims are contemplated as being within the purview of the present invention.

What is claimed is:

1. In an electrochemical primary energy cell having an anode, a cathode, and an electrolyte between the anode and cathode, said cathode having a structural base element and an electrochemically active cathodic material carried by said element; the improvement wherein the surface of said element carries a coating of sintered nickelous ammonium sulfate thereon, said coating being interposed between said element and said active cathodic material.

2. In a cell as set forth in claim 1, said element being stainless steel substantially free of surface oxides.

3. In a cell as set forth in claim 2, said element having a coating of nickel carbide between the surface thereof and the first mentioned coating.

4. An electrochemical energy cell comprising: a foraminous anode having perforations therein, a porous separator overlaying said foraminous anode and substantially conforming in surface contour to the perforations in said foraminous anode, and a cathode overlaying said porous separator and also substantially conforming in surface contour to said perforations in said foraminous anode.

5. An electrochemical energy cell as set forth in claim 4 wherein said cathode comprises a foraminous base element and an electrochemically active cathode material coated on said base element in such a manner that said active cathode material coats said base element and completely fills in the perforations of said foraminous base element.

6. An electrochemical energy cell as set forth in claim 5 wherein a coating of sintered nickelous ammonium sulfate is interposed between said foraminous base element and said active cathode material.

7. An electrochemical energy cell as set forth in claim 6 wherein said foraminous base element is a sheet of stainless steel that is substantially free of surface oxides.

8. An electrochemical energy cell as set forth in claim 4, wherein the percent of voids area to overall area of the foraminous anode is about 6.6.

9. An electrochemical energy cell as set forth in claim 4, wherein the anode and cathode are each formed from a strip of folded on itself sinusoidally to form a continuous series of juxtaposed leaves, with one folded strip arranged transversely to the other and being interleaved with the leaves of the other.

10. An electrochemical energy cell as set forth in claim 9, wherein said transverse arrangement is substantially orthogonal.

References Cited

UNITED STATES PATENTS

| | | | |
|---|---|---|---|
| 1,548,539 | 8/1925 | Martus et al. | 136—111 |
| 2,527,576 | 10/1950 | Ruben | 136—111 |
| 2,754,348 | 7/1956 | Berchielli | 136—125 |
| 3,069,486 | 12/1962 | Solomon et al. | 136—30 |
| 3,345,211 | 10/1967 | Lafon et al. | 136—6 |
| 3,350,239 | 10/1967 | Stanimirovitch | 136—176 |
| 2,971,999 | 2/1961 | Jacquier | 136—6 |
| 3,216,859 | 11/1965 | Duncan | 136—6 |
| 3,261,715 | 7/1966 | Solomon et al. | 136—50 |
| 3,333,986 | 8/1967 | Chreitzberg et al. | 136—6 |

ANTHONY SKAPARS, Primary Examiner

U.S. Cl. X.R.

136—100 M